(12) United States Patent
Amiran (10) Patent No.: US 6,325,079 B1
(45) Date of Patent: *Dec. 4, 2001

(54) APPARATUS AND METHOD FOR REMOVING CONTAMINANTS FROM FINE GRAINED SOIL, CLAY, SILT, AND SEDIMENT PARTICLES

(75) Inventor: Mohsen C. Amiran, Des Plaines, IL (US)

(73) Assignee: BioGenesis Enterprises, Inc., Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/284,055

(22) Filed: Aug. 2, 1994

(51) Int. Cl.⁷ ..................................................... B08B 3/02
(52) U.S. Cl. ......................... 134/25.1; 134/133; 134/199
(58) Field of Search ................... 134/25.1, 133, 134/198, 199

(56) References Cited
U.S. PATENT DOCUMENTS 3,086,537  *  4/1963  Sieger ............................. 134/199 X
5,087,374  *  2/1992  Ding ................................ 134/25.1 X
5,228,921  *  7/1993  Peterson ............................. 134/25.1
5,316,029  *  5/1994  Campbell et al. ............... 134/133 X

* cited by examiner

*Primary Examiner*—Philip R. Coe
(74) *Attorney, Agent, or Firm*—Birch, Stewart, Kolasch & Birch, LLP (57) ABSTRACT

The disclosure of this application relates to a new and innovative method and apparatus for removing a variety of contaminants from soil, sediment, fine sand and clay. The disclosure describes an apparatus in which contaminated material that is comprised of particles having a size less than about 5 mm in diameter are injected into a zone of discharge from one or a number of nozzles. These nozzles are positioned to discharge liquid or cleaning fluid at a pressure from about 2000 psi to about 20,000 psi. The cleaned material is then collected and separated into liquid and solid phases. The solids, when cleaned by the use of this apparatus, can then be returned to the site without danger of contamination of the surrounding area and no disposal costs are incurred for disposition of contaminated soil.

29 Claims, 5 Drawing Sheets

APPARATUS AND METHOD FOR REMOVING CONTAMINANTS FROM FINE GRAINED SOIL, CLAY, SILT, AND SEDIMENT PARTICLES

This invention relates to a device and method for effectively removing contaminants from fine grained soils, clay silt and sediment particles.

SUMMARY OF THE INVENTION

This invention relates to a device for removing contaminants from soil, clay and sediment particles as may be found in areas contaminated by industrial chemicals, oils and the like. The device uses liquid to effectively remove contaminants from the surface of the soil particle. The device creates a zone of extreme turbulence by means of opposing high pressure jets of liquid directed at a single point. A slurry inlet device which injects a slurry of contaminated soil into the area where of the discharge from the nozzle devices. Contaminants are removed from the soil particles in the slurry as they pass through the intersection zone of the discharge from the water jets and the nozzles. By this means, the contaminants are separated from the surface of the soil particle. This leaves a substantially contaminant-free fraction of particles, and the contaminants can then be separated from the liquid by means well known in the art.

BACKGROUND OF THE INVENTION

Removal of contaminants from soil and sediment is a major concern for industry and governmental agencies. Purchasers and sellers of property often must submit certification that the property is free from environmental contaminants such as chemicals and oils prior to obtaining financing. Environmental awareness has also heightened the demand for effective contaminant removal systems.

Soils that are subject to contamination can be found in any manufacturing area. Companies that make, use or store chemicals or oils often experience spill events such as leaking storage tanks or spills during transport. Service stations or other facilities that use underground storage tanks often have contaminants around the tanks due to small leaks or spills that occur in filling the tanks.

The soils that are affected by spill events are a combination of many particle sizes. Contaminated soil particles may range in size from large rocks to fines and clays, which are extremely small particle sizes.

Environmental cleanup protocols usually call for separation of the contaminated soil into its fractions based upon size. The basis for such separation is that larger sized soil particles are easier to clean. Thus, particles sized greater than about 0.6 mm are separated from the smaller particles.

Generally the larger particles are cleaned using conventional means known in the art. Smaller particles size fractions of contaminated soils are transported to appropriated storage and disposal facilities.

This process does not clean the entirety of contaminated soil particles. The standard practice merely transfers the contaminated fraction of fine size particles to a facility where such particles are stored. In certain instances contaminated soils are treated as hazardous waste.

Sand, gravel and stone, all of which particles are larger than 0.063 mm can be cleaned with relative ease. Smaller soil particles are more difficult to clean, and therefore these particles have generally been removed from the soil to be disposed of as hazardous or special waste. Thus, soil cleaning has involved a reduction of volume of the total contaminated soil in by removal of contaminants and pollutants from larger grained soil particles and separation of the fine grained particles for disposal.

Disposal costs are high for the transportation and storage of contaminated soils and clay. The availability of disposal sites for such contaminated soil and sludge is limited by the availability of land that is suitable for disposal. Disposal and storage options are further limited by the desire to retain contaminants in an essentially closed system wherein the contaminants will not leach to a neighboring water table.

Technologies are well-known in the art for cleaning larger grain sizes of soils using surfactants, heat or mechanical processes such as agitation. By these means, which can be used alone or in combination, contaminants are disbursed in a cleaning liquid which can be further treated by a variety of processes to remove or reduce chemical contaminants in the liquid.

Soil cleaning (which here concerns sediment, soil, fines, clays and large particle cleaning) is based upon the principle of separation and optimization of treatment directed at specific particle size domains. Soil cleaning can be applied to a wide variety or projects wherein contaminants are present.

These processes are ineffective for the removal of contaminants from particles that are smaller than about 0.6 mm in diameter. Thus the well know technologies for removing contaminants from soils and sediments are only effective for the larger soil particles. The current technology requires separation of contaminated soil into two unique streams, that being larger particles (diameter larger than about 0.5 mm.) and fines and clays.

The larger size particles can be effectively cleaned using standard methods, and the washed soil can be safely returned to the site after treatment. The fines or particles smaller than about 0.63 mm are not able to be cleaned using standard methods. Particles in this size domain are segregated from the totality of contaminated soil and then disposed of in an appropriate facility, or stored.

Thus, current soil cleaning technologies are only effective for large soil particles. The smaller particles are not cleaned at all, but simply transferred to a storage facility such as a licensed hazardous waste facility. This requires the site owner or operator pay high costs for transport and storage of contaminated particles. The disposal facility also must be carefully constructed and monitored to prevent leakage from that site to groundwater. In essence, this simply transfers the problem from the original contamination site to a storage facility. The treatment of contaminated soil has not been successful for cleaning fine grained soil material.

The present invention effectively removes contaminants from the entirety of contaminated soils and avoids the problem of disposal of the fraction of contaminated soil that includes the fines and clays. Application of this device to a contamination site avoids disposal of large amounts of contaminated soil as hazardous waste.

Contaminated soils generally have contaminants in three typical states; as free material, as surficially adsorbed material or as small or colloidal material wherein contaminants are bound physically or electrochemically to the finer grains of soil. The standard method of reducing soil contamination through the use of particle size separation is based on the fact that most organic or inorganic contaminants will tend to be associated with the fine grained soil fraction usually represented by clays and silts. Removal and disposal of the fines and clays will take a large amount of the contaminants out of the soil. However, it really does not clean all of the contaminated soil.

Decontamination of soil requires an understanding of the nature of the soil matrix in which the contaminants are bound. Generally, a coarse soil matrix, consisting primarily of large soil-sized particles is the ideal candidate for conventional soil cleaning or washing.

Contaminated soils are generally treated by the standard methods of separation by size and washing of larger particle sizes. Contaminants suitable for removal by conventional methods are semi-volatile organic compounds, pesticides, poly-chlorinated bi-phenols (PCB), metals, certain radionucleotides, and poly-aromatic hydrocarbons or soil particles >2 mm in diameter. Volatile organic compounds (VOC's) are not particularly suited as target contaminant treatment materials because of the generally aggressive mixing and material handling in the cleaning process results in the possibility of resultant release of VOC's to the air.

The usual limitation in soil washing or decontamination results from the type of soil matrix and the contaminant involved. Contaminants generally adhere or are adsorbed at a greater rate in fine grained materials. This is a result of the complex and strong binding forces that are exerted by fine grained materials. Course grained materials may also retain contaminants as a result of adsorptive binding forces, however large grained materials are generally easier to clean as the adsorptive binding force is generally lower as the particle size increases.

TABLE I

Table I shows the classification of particles by conventional sizing. The result of application of standard methods of soil washing are that fines and clay are sent to disposal or storage sites because of the limitation of conventional cleaning processes. Thus the segregation of fines from the larger soil matrix reduces the volume of contaminated soil requiring disposal. However, separating the fines and clays does not solve the problem. It only results in a storage problem. The contaminated soils must be transported and stored at costs in the range of $20 to $200 per cubic yard, depending on the type of contaminant.

The conventional process may separate relatively uncontaminated soil fractions from more heavily contaminated fines. The resulting fines slurry may then be treated by application of a bio-activated treatment or metal chelation. The fines in clay essentially are treated to result in a less contaminated sludge product. This process generally concentrates organic contaminants into a contaminated fines slurry which can account for a majority of the organic contaminants by weight, while initially being a smaller fraction of the total process output. In addition, these fine grained materials are more difficult to dewater to form a sludge cake because of the affinity of smaller particles to adsorb a variety of materials including water and other hydrophilic contaminants.

Standard soil washing procedures begin with pretreatment through shredding and separation devices to segregate soil and sediment by particle size. The soil is then directed to a shaker screen that separates particles into streams based upon particle site. Material greater than one to two millimeters is treated in a standard large particle soil washer, which involves the application of heat, agitation, and surfactants to separate adsorbed material from the larger particle sizes. Smaller particle sizes are directed to disposal. These particles may be dewatered, if necessary, in a hydrocyclone for liquid and solid separation.

Surfactants are often added to the cleaning liquid to accelerate the process and aid in the process of breaking the adsorptive and absorptive bonds between the contaminant and the contaminated particle. However, surfactants may present additional difficulties due to the toxicity of the surfactants. Many devices for removing contaminants from soil particles are known in the art. These devices do not decontaminate fine soil particles, clays, silts and the like.

In U.S. Pat. No. 4,415,368 to Kroon, a method is disclosed wherein a jet pipe is employed to produce a vacuum which is to theoretically remove the contaminants by means of passing the particles through a curtain spray of water. Kroon uses the water curtain to separate particles into their smallest basic unit, thereby breaking up clumps of contaminated soil. The larger particles are then cleaned in this method, and the smaller particles and contaminants are separated by flocculation. According to NATO Report, *Demonstration of Remedial Action Technologies for Contaminated Land and Groundwater, Final Report*, 1986–1991 published by the U.S. Environmental Protection Agency, February 1993, small particles, of diameter less than 0.03 to 0.05 mm are not cleaned effectively by the water jets in the configuration and at the pressures put forth by Kroon.

In Kroon's method, contaminants are theoretically separated from the soil particles by application of a water stream which creates a vacuum. The pressure of the water stream is 250 bar which is approximately 3,500 psi (pounds per square inch). However, this method does not effectively remove contaminants from clays or finer grained soil.

Darley, in U.S. Pat. No. 3,764,008 discloses a method for de-oiling sand using a combination of jet cyclones and Venturi arrangement. Darley uses centrifugal forces to separate oily waste from sand. His process requires several passes through the device to remove only a portion of the contaminant. However, this method does not effectively remove contaminant from fine grain particles as does the present invention. Further, the device disclosed does not effectively treat the very finest sand particles as are commonly encountered and which are classified as sands, clay, or silt. Also, his process does not utilize a method that is similar to this invention, in either its method, configuration or result.

Other methods have been disclosed which essentially employ the application of heat to volatilize or incinerate contaminants. The disadvantage of these methods are that contaminants may be released to the air, and, the incineration method required huge input of thermal energy which is not as economically efficient as the present invention.

DETAILED DESCRIPTION OF THE INVENTION

This invention utilizes apparatus to mechanically remove contaminants from the surface of soil, silt, clay and fines particles. These particles are entrained into a liquid carrier to form a slurry. The liquid carrier is introduced to a region of intersection of discharge streams from previously positioned nozzles. The discharge streams may be water alone, or water mixed with a surfactant. These discharge streams are discharged from two or more substantially opposing nozzle devices. The nozzle devices are attached to a frame. The frame is utilized to support the nozzle means, and also functions to allow the proper positioning of the nozzle devices.

The nozzle devices discharge liquid in a preferred pressure of between 2,000 psi and 20,000 psi. The pressure setting is determined based upon the size of particle treated and the type of contaminant that is to be removed from the surface of the particle. In addition, utilization of a single nozzle can be accomplished using a discharge from the nozzle at about 10,000 psi to about 20,000 psi.

A stream of the soil that is to be treated is injected or inserted into the area where the streams of washing liquid are discharged from the nozzle or where the discharge from at least two nozzles converge. In this area, the particles of soil are subjected to a total force of about 4,000 psi to about 60,000 psi depending upon the number of nozzle devices employed.

In the most preferred embodiment, discussed below, the total number of nozzle devices used is four. However, the operator may find that use of one, two, three, four, five or more nozzle devices may be appropriate and effective to accomplish the removal of contaminants from the surface of small sized soil, silt and sediment particles.

The invention may also be modified to affect the angle of collision between the discharge of the nozzle devices and the inlet stream of slurry. It is to be remembered that the slurry may contain a carrier liquid, such as water with the slurry. The slurry can also have surfactant added to it during pre-treatment or during the treatment in the collision chamber.

The slurry discharge is directed to a point of discharge from the nozzle. If more than one nozzle is employed, the slurry discharge should be directed to the point of intersection of the nozzles. This can be accomplished by adjusting the nozzle support frame, directing the nozzles in a particular direction, or by altering the angle of insertion of the stream of the soil slurry.

The zone of convergence of the streams from the nozzle devices is a zone where objects or particles injected into the area will be subject to great force. The contaminated particles that are inserted into this zone have the contaminant removed from the particle. It appears that most contaminants are on the surface of the smaller particles of soil. Thus the bond between the contaminant and the soil particle is adsorptive. This bond is easily disrupted as such a bond is primarily a weak electromechanical bond. By this means, the soil particle is then separated mechanically from the contaminant. The contaminant particles remain in the liquid carrier and the soil particles are directed to the bottom of the collision vessel by means of gravity. From there, the carrier, cleaned soil particles and used cleaning liquid is discharged by means of a drain mechanism, as is well known in the art.

It is the force of the liquid discharged from the nozzle device, or in the zone of convergence of the opposing discharges from the nozzle mechanism which removes the contaminants from the surface of the particles that are cleaned. This turbulence must be sufficiently great. It has been determined that the number of nozzles determines the discharge rate from the nozzle devices.

When a single nozzle is employed, it was found that discharge of about 10,000 psi to about 20,000 psi resulted in removal of contaminants in the range of about 85 percent removal to about 90 percent removal. The utilization of two or more nozzles increased the removal rate of the contaminants. When two or more nozzles are used, the discharge rate from the nozzles of about 2,000 psi to about 20,000 psi are effective in removal of more than about 90 percent of the contaminants.

The discharge of the cleaning liquid at sufficiently high pressure may be enhanced by addition of surfactant to the washing liquid or by addition of surfactant to the carrier of the soil slurry stream. The interaction of the mechanical forces with or without surfactant are thereby sufficient to accomplish the mechanical separation of contaminants from soil particles.

The result of application of the instant device is a slurry of clays, fines and silts which are cleaned within the range of from about 89% removal of contaminants to about 99% (or greater) removal of contaminants. This range allows the treated material to be used as uncontaminated soil.

Multiple cleaning cycles can be accomplished by re-introducing the treated material into the cleaning vessel and repeating the cycle.

A particular advantage of use of this device is that contaminants tested in utilization of the claimed device, resulted in cleaned soil particles (clays, fines and silts) that are suitable for use in any area. The removal of contaminants was so thorough as to preclude disposal of these materials at any hazardous waste or other special waste facility.

Thus, this device provides for cleaning of these finer particles while avoiding the additional cost of disposal. It is estimated that the cost for treatment per cubic yard using this device is substantially less than the cost of disposal of contaminated materials in the range of $4.00 to $350.00 and up for each cubic yard of contaminated soils. Such disposal must be accomplished at a licensed hazardous or special waste facility and requires transport of the material to be regulated by several agencies.

The present invention is capable of cleaning heavy hydrocarbon pollutants including crude oil, poly-aromatic hydrocarbons, fuel oil and diesel from most matrices, including fines and clays. The process is appropriate for contaminants in the broad range of organic, inorganic and metal compounds where clay and silt is often the predominant media can be effectively decontaminated or cleaned using this application.

The present invention solves three obstacles to wide spread implementation of soil washing technology. These obstacles are, inability to handle heavy molecular weight contaminants or pollutants, inability to wash small sediment such as silt and clay particles, and the huge capital cost and relative immobility of large processing plants used in soil washing technologies.

The present invention also incorporates application of synthetic bio-surfactant chemicals (Biogenesis Inc., Milwaukee, Wis.) that may be used depending upon the contaminants encountered. These bio-surfactant chemicals can provide continuing remediation action after the washing is completed to more thoroughly reduce the contaminant levels in the washed soil product.

The present invention is an on-site technology which may be used for all soil types contaminated by organic pollutants and metals. Particles greater than about 0.5 mm are treated by standard soil washing processes and the liquid employed for such treatment is then further treated to remove contaminants from that liquid. Particles sized at less than about 0.5 mm can be easily treated in the device of this invention, i.e. this soil and sediment washing process.

The cleaning fluid, which can be water alone, can be further treated and the cleaned soil and sediment is then returned to the site or otherwise used.

The application of this invention can be in conjunction with a complex bio-remediating surfactant blend, in conjunction with water, heat, mixing and friction to clean soil particles. It is well known in the art that large particle size washing units can clean more than 80 cubic yards an hour.

In the present invention, sediment and soil particles (also defined as fines and clays) can be cleaned in a mobile continuous flow unit at a rate of more than 80 yards an hour without requiring additional disposal of fines and clays.

The equipment requirements include particle sizing equipment, tanks, the watering and water treatment equipment and a bio-reactor all of which are standard in the art. The collision chamber, which is the subject of this invention, allows the operator to clean the fines and clays.

The sediment washing device can be configured as a continuous flow unit.

Segregation of particle size may be accomplished using the Wentworth Classification or other system well known in the art. The only requirement that must be met is that grain size be less than about 5 mm in diameter.

DESCRIPTION OF THE CONFIGURATION OF THE DEVICE

In this discussion, the device is shown in FIGS. 1–4. The configuration is suitable for use in cleaning a large quantity of soil taken from a contaminated area which had been used as an industrial site. The contaminated soils in this area were a combination of sand, gravel, loam, fine sand and clay.

The sediment washing system was configured in two basic sections. These sections provided for sediment sizing and preparation of soils for treatment in Part 1 and cleaning of soil particles in the cleaning vessel in Part 2.

Figure 1:
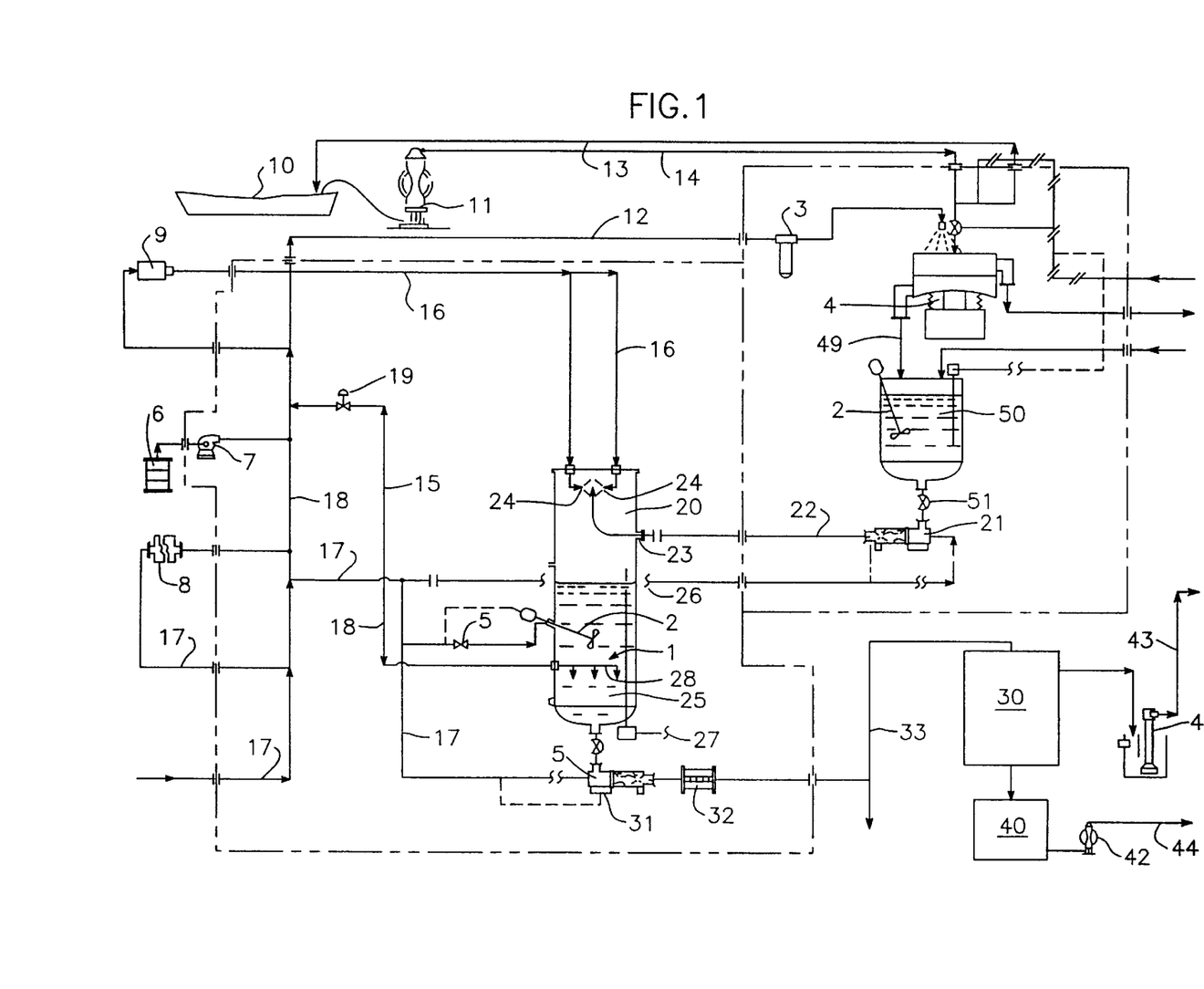
FIG. 1 is a schematic diagram showing the steps of pretreatment phase of separation of contaminated soils by size, preparation of the slurry to be treated, and the utilization of the collision chamber for treatment. The diagram also shows addition of various enhancers which improve the removal rate of the washing liquid.

In the first step, and with reference to FIG. 1, it is seen that contaminated material, also referred to as sediment, is first separated according to particle size. The material was taken from sediment pond 10 and piped via sludge line 14 to the wet screen apparatus 4. The wet screen feed pump 11 used was Liquid Waste Technology of Somerset, WI, the Pit Hog 900 Hydraulic Pump. The sludge was moved along the sludge line 14 by means of the wet screen feed pump 11. When the sludge material is processed through the wet screen 4, (Vibro-Energy Separator LSZ4S461 SWECO Inc., Florence Ky.) materials having a diameter of greater than about 0.5 mm are separated. The smaller materials are transported to the fines clay storage tank 50 by means of a fines clay hose 49. In line mixers may be employed to prevent the material from settling and to aid in movement (Model 50-FT-2 Inliner. Grey Lightnin, Toronto, CAN). Larger size materials are treated by conventional means well known in the art.

In the fines clay mixing chamber 50 the material is stirred by means of a mixer assembly 2 (Litnin, Model V5P55 VEKTOR Mixer with 11.8" in a turbine, Litnin Co., Rochester, N.Y.). Mixer assemblies are well known in art. The fines clay mixture has water added to it to form a slurry. The fines clay slurry then flows from the fines clay tank 50 through a fines clay feed meter 51 to the collision chamber feed pump 21 wherein it is piped through the fines clay through pipe 22 to the collision chamber 20.

Step 2 of the process occurs in the collision chamber 20 where contaminant removal occurs. Upon entering the collision chamber 1 the fines clay slurry is passed through the intersection point of the spray from nozzle devices 24. The treated slurry then drops by means of gravity to the treated slurry holding tank 25 in the collision chamber 20. The slurry in the mixing zone of the collision chamber 20 was then gently agitated with a mixer assembly 2 to keep the cleaned material in suspension in the carrying liquid. This is accomplished by means of a mixer 2 (Litnin, V5 P55 VEKTOR Litnin, Rochester, N.Y.). The treated soils were then removed from the collision mixing vessel by means of gravity or an auxiliary feed pump 31, through the drain means 304 and thence through the exit hose 31.

The nozzle device 24 is mounted on a nozzle adjustment arm 407. This nozzle adjustment arm 407 is comprised of the nozzle bar 401, which is affixed to the nozzle collar 402. This assembly is attached to the nozzle frame 400. The nozzle bar 401 can be adjusted with reference to the level of any of the other nozzles 24, if more than one nozzle is used. In addition, the nozzle devices 24 may be adjusted so that the discharge from the nozzle device, or any one of them, may be at a particular angle relative to the discharge from the slurry inlet pipe 231. These adjustment features are designed to allow the operator to adjust the angle of discharge of the nozzle. The nozzle adjustment arm 407 and the nozzle anchor adjustment bracket 341 are cooperatively attached to the nozzle support gusset 342. The various elements of the nozzle support means can then be adjustably fitted to the nozzle bar 401, which forms a part of the frame means for holding the nozzle devices at a particular angle and at the desired height within the cleaning vessel.

The nozzle adjustment mechanism is made of stainless steel. The nozzle bar is made from carbon steel. Nozzle heads for discharge of, in this invention, cleaning liquid, are well known in the art.

The nozzle 500 for discharge of cleaning fluid was obtained from Quality Spray Products of Elmhurst, Illinois it is model number 1/4M6.5-7E Tungston Carbide Spray Nozzle. It is a high pressure nozzle for discharge of cleaning fluid at a desired pressure between 2000 psi and 20,000 psi, depending upon the configuration of nozzle 500 devices, the contaminant which is to be removed and the nature of the contaminated material that is cleaned in this device.

Figure 3:
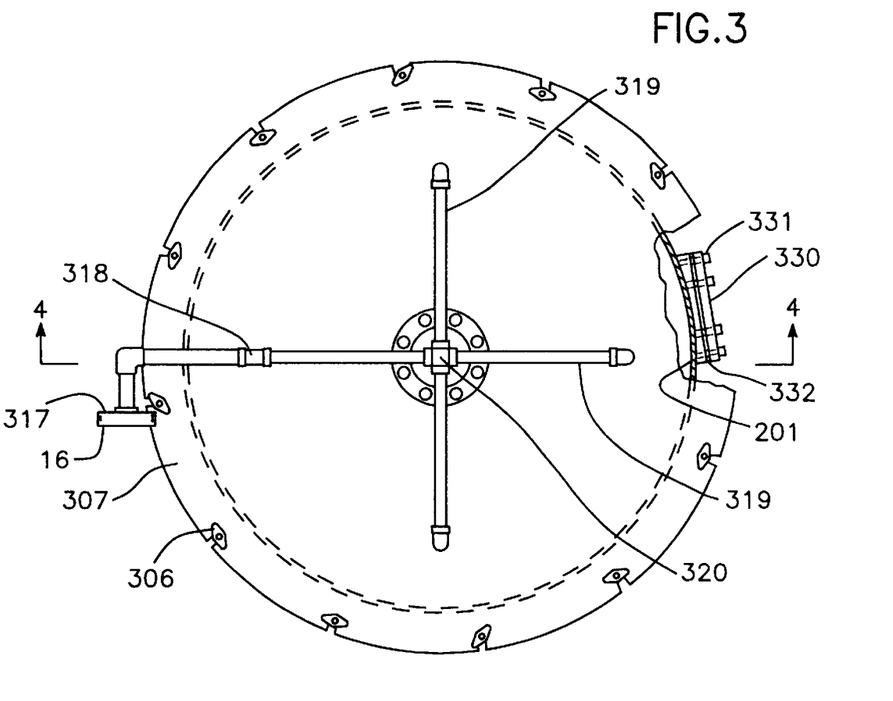
FIG. 3 is a top view of the collision chamber lid.
Figure 4:
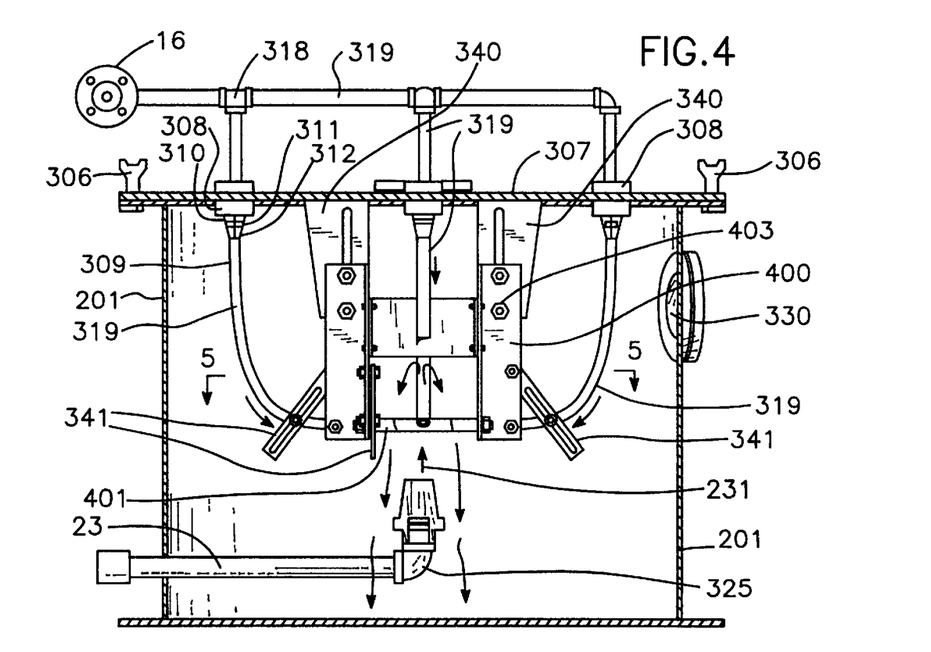
FIG. 4 is a cutaway of the upper third of the collision chamber.

The nozzle adjustment frame 400 (and positioning device) allows the operator to select the appropriate angle of intersection of the discharge from the nozzle device relative to the sediment inflow discharge head 231 which is mounted so that the sediment inflow discharge preferably is above the plane of intersection of discharge from the nozzle devices 500. However, the operator may desire to have the sediment inflow from the top of the device depending on special constraints and design preferences. The position of the sediment inflow device is not critical to the function of this device, so long as the sediment inflow device allows the operator to cause the slurry in the sediment inflow 23 to pass through the plane of intersection from the discharge of the nozzle devices 500 as is shown in FIGS. 3 and 4.

In operation of this device, the operator may wish to accomplish additional cleaning cycles with the treated material. This once-treated material may be recycled throughout the same collision chamber 20 or may be directed to a second or third unit for additional treatment cycles. However, it has been determined that additional treatment cycles are largely unnecessary if the cleaning cycle is optimized.

This optimization occurs by adjusting the angle of the plane formed by the discharge from the nozzle devices by adjusting the appropriate element on the nozzle frame, adjusting the temperature of the slurry inflow. Also, the temperature of the cleaning liquid may be adjusted to increase removal efficiencies. It has be found that raising the temperature of the cleaning liquid to about 100 degrees F.

In the event the additional treatment cycles are not necessary, the treated material is then piped by means of the treated sludge pipe 33 to a hydrocyclone 30. Hydrocyclones are well known in the art, such as (Encyclon, Inc. Kenosha, Wis.). After the water/sludge separation is accomplished in the hydrocyclone 30 the resulting solids are fed to the solids collection bin 40 and then transported by means of a solids transfer pump 42 or other appropriate mechanism to solids storage 44.

The water which was separated in the hydrocyclone 30 is piped via a liquid transfer pump 41 to a liquid storage tank 43 for subsequent treatment, or may be recycled through the soil washing process by means of additional piping which may be supplied by the operator in accordance with the requirements of the application of this invention.

In this example, the cleaning material is water, which can be ordinary tap water from a city or municipal source which is piped through pipe 17. The water may be heated to about 100° to about 160° F. It has been determined that the cleaning liquid may be at any temperature above freezing to a temperature approaching 200 degrees F., or from about 33 degrees F. to about 200 degrees F.

Additionally, a cleaning liquid such as water water may be combined with a measured amount of a selected surfactant from the surfactant dispenser 6. The surfactant that was employed in this invention was a bio-surfactant from Biogenesis, Inc., Milwaukee, Wis.

The surfactant/cleaning liquid combination can be piped through the surfactant feed pipe 180 or may be later introduced into the device by later injection into water in pipe 18. This gives a measured amount of surfactant which in combination with the water acts to enhance the cleaning effectiveness of the cleaning liquid.

The water alone or water-surfactant mix 17 is then directed through the high pressure piston pump 9 wherein the pressure is raised to a range between about 2,000 psi to a maximum of about 20,000 psi. The water or water surfactant mix under high pressure is directed through a high pressure line 16 to the nozzle assembly 24. The nozzle assembly 24 is arranged so that a spray of tap water alone or tap water in combination with surfactant 17 is directed to collide with a stream from the slurry inlet pipe 23 in the collision chamber 20.

Figure 2:
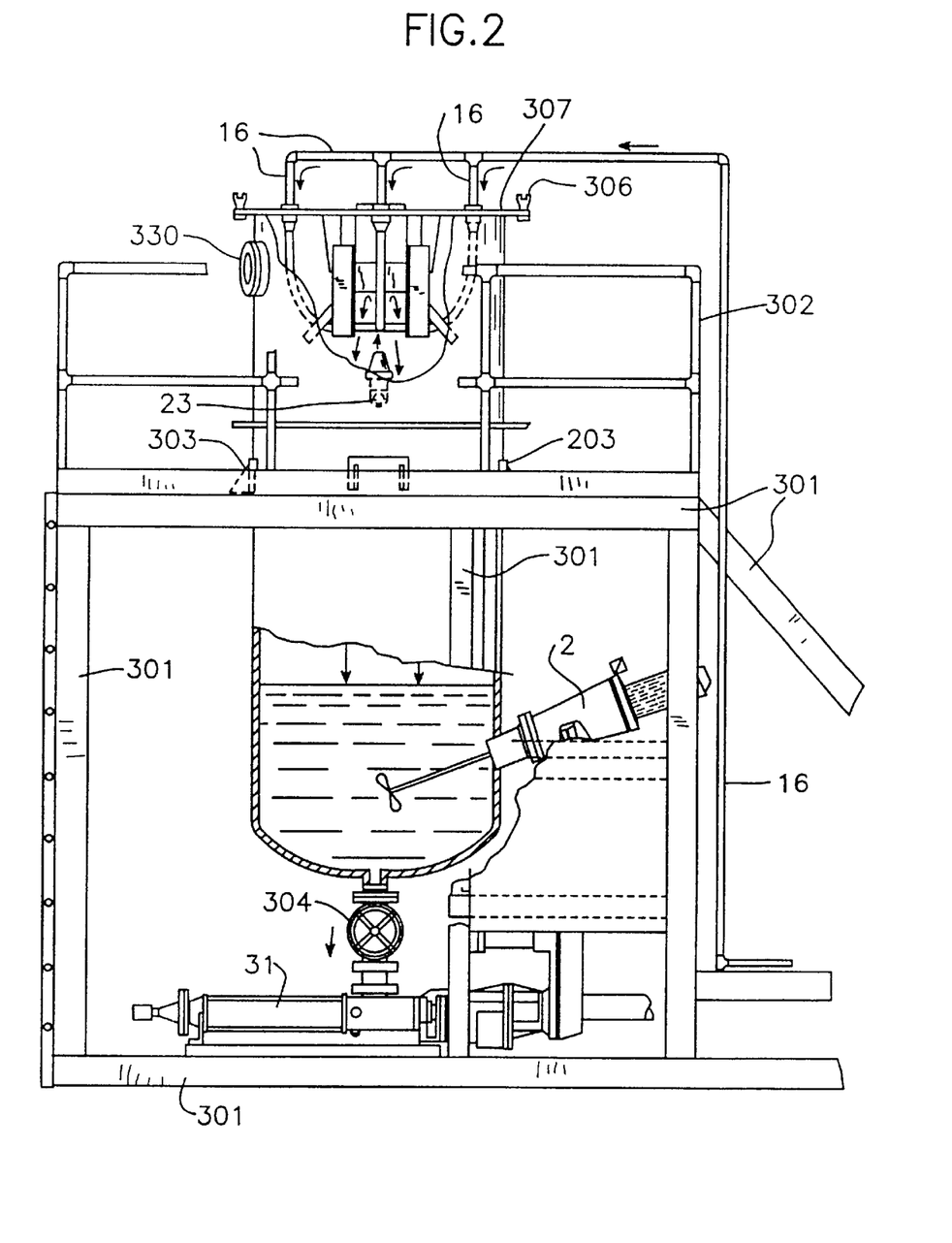
FIG. 2 is a side view of the collision chamber.

Referring to FIG. 2, a front view of the collision chamber assembly, it is seen that the frame 301 supports the body of the collision chamber 20. There is also provided a walkway 303 which is framed in by a handrail 302 for operator-adjustments and observation. At the top of the collision chamber 20, the high pressure line 16 is cooperatively fitted and inserted through the collision chamber lid 307 by means of flanges 308.

The collision chamber lid 7 is cooperatively fitted to the collision chamber 20 body by means of flanges 306.

The collision chamber 20 is also fitted with level sensors 303 which are designed to ensure that the collision chamber 20 remains level for optimal performance of the nozzle assembly 24. The collision chamber device is fitted with a mixer assembly 2 which is standard in the art. This mixer assembly 2 is used to keep the treated solids from separating into a heavy sludge and water component. The utilization of the mixer assembly 2 ensures that fines and other solids do not settle out; thereby the mixture remains in a slurry.

The treated material is directed of the mixing chamber 1 of the collision chamber assembly 20 by means of an isolation valve 304. This valve 304 is type well known in the art. The treated slurry is then directed through a pump mechanism 31 to either a hydrocyclone 30 or is recirculated through the collision chamber 20 by means of a pipe assembly 16. An electrical panel 305 is provided for convenient mounting on the frame member 301. This electrical control panel 305 is used to control the pump such as pump 31. There is also provided a porthole window 330 which is mounted at the side of the collision chamber 20. This porthole assembly 330 is provided to allow the operator to observe the process of interaction of the surfactant water mix or water mix and the fines clay slurry.

Referring now to FIG. 3, which is a top view of the collision chamber there is displayed the cover 307. The high pressure line 16 is here displayed on the top of the collision chamber wherein the high pressure lines are connected to the nozzle mechanism 24 by means of a socket weld 318 which is cooperatively adjoined to the high pressure surfactant hose 319. Other arrangements of the surfactant water delivery system to the high pressure nozzle 24 can be readily ascertained by one skilled in the art.

The collision chamber cover 307 is affixed to the body of the collision chamber by means of mounting flanges 306. In this arrangement, the nozzles (24) are attached to the cover 307. The view in FIG. 3 shows an arrangement of high pressure feed pipes 319 which are positioned over the lid 307 of the collision chamber 20. The intersection point of the high pressure feed lines 319 is a flange 320 which holds the high pressure feed pipe 319 in stable relation to a second high pressure feed pipe 319. The practitioner may choose to use an arrangement of only two opposing nozzles 24 if desired. That would require only one high pressure feed pipe 319. The high pressure feed pipe 319 is attached to the nozzle assembly by means of a socket weld 318. The nozzle assembly 24 is further described by FIG. 4.

FIG. 4 is a partial view of the upper most portion the collision chamber 20. This figure shows the valve and nozzle assembly 24 which is held in place on the collision chamber lid 307 by means of an anchor mount 340, a support gusset 342 which is cooperatively attached by means of hex nuts and bolts 403. The nozzle assembly is fitted with adjusting means 341 which allow the operator to keep the nozzle assembly 24 in a level position. The slurry is directed into the collision chamber by means of the slurry inlet pipe 23. After it is piped into the chamber the slurry is further directed upward and exits the slurry inlet pipe 23 from a slurry inlet nozzle 231, and then the slurry is directed into the intersection area of the discharge from the nozzle device or devices 24. The slurry which is introduced into the collision chamber under pressure which need only be adequate to cause the outflow from the slurry inlet nozzle 231 to be sufficient to cause the slurry to actually reach an area that is sufficiently close to the nozzle discharge from the nozzle 24 so as to allow the cleaning liquid to effectively act on the slurry for removal of contaminants from the slurry.

This flow rate allows the slurry to be injected upwards into the intersection point of the discharge of the nozzle assembly 24 wherein the washing or cleaning of the slurry takes place.

Again in this FIG. 4 there is a quartz glass window 330 provided which is fitted into the side wall 201 of collision chamber 20 for purposes of allowing the operator to view the washing process. Despite the character of the slurry, the continued infusion of cleaning fluid, which is either water or water in surfactant mixture, rapidly cleans the glass, in the event that the slurry flow through pipe 23 is interrupted momentarily, or if the slurry is largely liquid, the process of cleaning the slurry will also result in a wash down of the sides 201 of the collision chamber 20.

Figure 5:
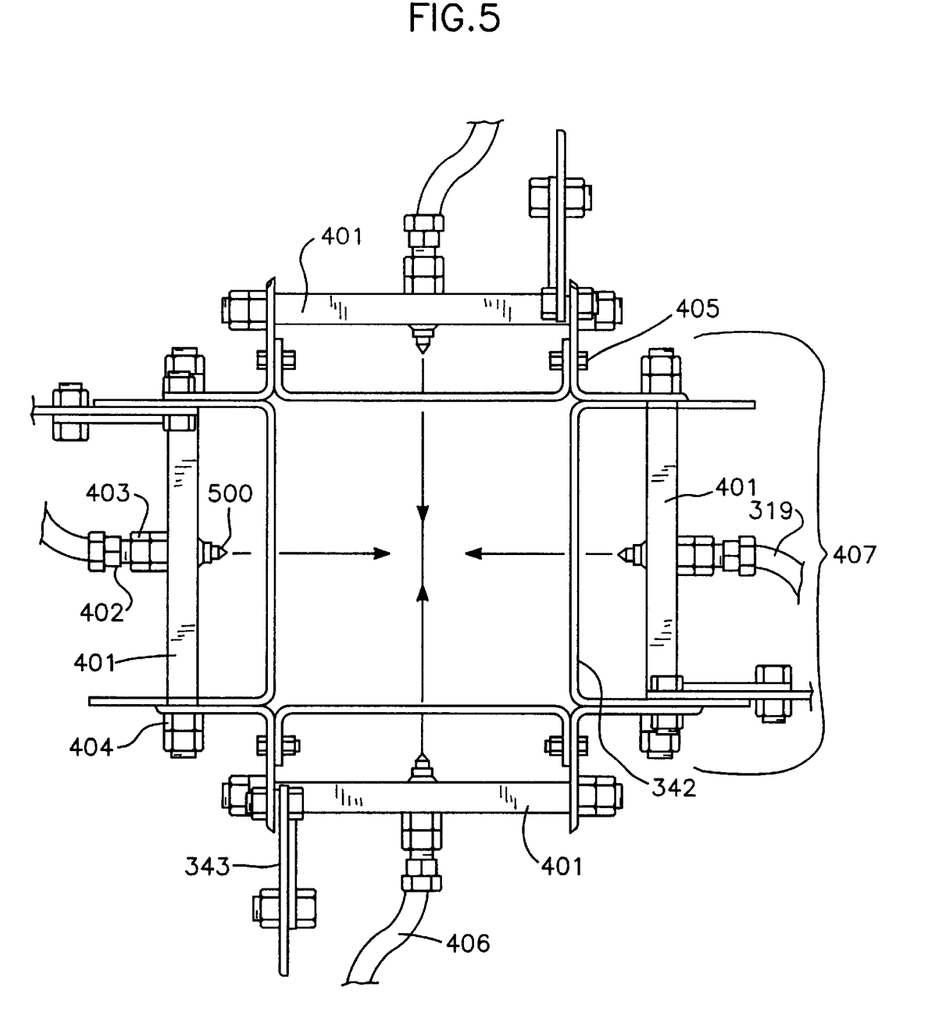
FIG. 5 is a detailed diagram of the nozzle and high pressure jet assembly which is shown in place in FIGS. 2 and 4.
Figure 6:
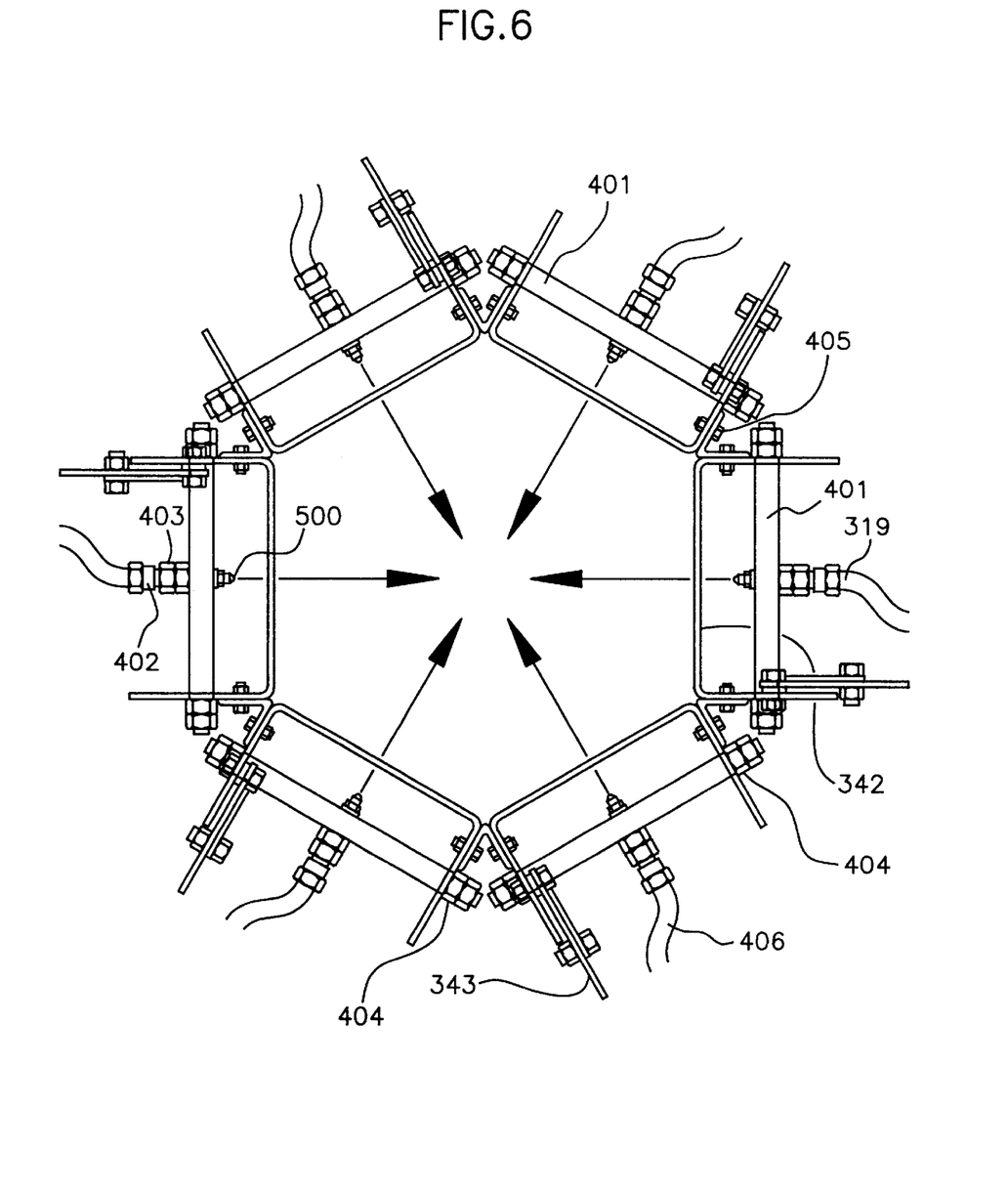
FIG. 6 is another detailed diagram of the nozzle and high pressure jet assembly according to the present invention.

FIG. 5 shows the nozzle assembly in its most preferred embodiment. This assembly is characterized by a stabilizing interaction of rack and gusset means which hold each of four nozzle bars 401. Each nozzle bar 401 is fitted to the nozzle 500 by means of a nozzle collar 402. The nozzle collar 402 is then cooperatively fitted to the high pressure surfactant line 16 by means of hex nuts 404.

The nozzle gusset brackets 342 are arranged above the discharge level of the nozzles 500 so as not to impede the flow from the nozzle 500.

The nozzle bars 401, in cooperation with the nozzle gussets 343 and 342 form a frame which suspends the nozzle structure 24 in the collision chamber 20. The nozzle bars 401 are fitted with adjustment means such as are widely known in the art. In this instance, the nozzle bars 401 are easily adjusted by means of a adjusting the adjustment bracket 341.

This entire structure of FIG. 5 is fitted to the collision chamber 20, as shown in FIG. 4. Other arrangements for positioning the nozzle mechanism will be obvious to the practitioner of this invention. The particular arrangement of the device shown in the drawings may be manipulated without interfering with the efficiency of the device.

The nozzles assembly 24 is positioned so that the discharge from each and every nozzle 500 discharges at a point that is approximately level with any and all other nozzles 500. This discharge forms a layer of water that approximates the geometric shape of a plane. At a point approximately in the middle of the zone of discharge there is created a zone of intersecting water jets from the nozzles. This zone is the area where the discharge from the slurry inlet 231 will be directed. The angle of the plane defined by the discharge of the nozzles 500 and the slurry inlet 231 may affect the efficiency of the operation of this device.

The cleaning liquid, which is discharged from the nozzle (s) 500, may be water alone, water in conjunction with surfactant, heated water, or heated water in conjunction with tap water. The cleaning liquid in conjunction with tap water may be a mixture or surfactant may be injected into the cleaning fluid pipe 12, which transports the cleaning liquid from the high pressure piston pump 9 to the nozzle feed line 319 and thence to the nozzle 500.

The conditions and parameters of the preceding description were used in the application of the device, as further set forth in the following examples.

EXAMPLE I

The device as configured for this Example was a continuous flow unit for cleaning fines and clays. Capacities of up to 80 to 100 cubic yards an hour were processed using parallel processing in a series of collision chambers.

Sediment contaminated with more than 4000 ppm polyaromatic hydrocarbons (PAH) was selected for cleaning. The contaminated sediment was predominantly (81%) medium silt having an average particle size of less than 38 microns. The sediment was initially processed to separate large size material. The large particle size materials were diverted to a standard large particle washer for treatment. Material passing the grizzly flowed to a shredder and then to pretreatment tanks. The shredded material was blended, heated, and mixed with water and bio-surfactant chemicals. This formed a slurry.

The slurry was then passed to a shaker screen separator that sized particles into two streams. Material greater than 0.5 mm diameter was diverted to a standard large-particle soil washer. Material 0.5 mm and smaller continued to the sediment washer feed hopper. From there the slurry was pumped to the sediment mixing chamber, where it was treated with a solution comprised of 2% bio-surfactant (Biogenesis, Milwaukee, Wis.) and tap water. This accomplished primary loosening of the bonds between the contaminant and the particle. The slurry was heated to 160° F.

After heating the slurry, water and surfactant mixture, the mixture (referred to in this Example as slurry) was piped to the collision chamber where the slurry was injected into the area of intersection of four nozzle devices.

The treated slurry was then collected in the lower portion of the collision chamber by means of gravity, as after the material is treated it fell to the bottom of the collision chamber.

Three collision chamber/collision scrubber sets were connected in series to accomplish successive washings. The treated slurry then flowed through hydroclyclone banks to separate solids down to 5 to 10 microns in size. The free liquid was routed to a centrifuge for final solid-liquid separation.

Solids were directed to the clean soil pile, whereas all liquid was routed to wastewater treatment to remove organic and inorganic contaminants. Decontaminated water was recycled back through the process. The treated sediments and fines were tested for cleanup efficiency. It was determined that the cleaning efficiencies exceeded 90 percent removal by application of these methods.

In Examples 2–7 the following general conditions were employed.

Particle sizes were selected for particles passing 10, 50, 100, and 200 mesh. The test contaminant was lubricating oil which was applied to the particles and allowed to remain on the particles for approximately 12 hours. Lubricating oil was selected as a representative contaminant of a medium weight organic type of contaminant. Lighter molecular weight contaminants would be expected to have higher removal percentages under all conditions, while heavier molecular weight contaminants would be expected to have somewhat lower removal efficiencies.

However, in all uses of this invention it will be expected that when the apparatus is used at its maximum efficiency for a particular contaminant removal task, cleaning efficiencies will be higher than 90%.

The cleaning liquid selected was water. In the following examples, no surfactant or other cleaning chemicals were not added to the cleaning liquid evaluated so as not to affect the evaluation of the mechanical efficiencies of the device. Surfactants may be added to the cleaning liquid to increase the efficiency of the invention as discussed, supra.

As was seen in Example 1, the use of cleaning chemicals in the cleaning liquid, or alternatively mixed in with the soil and sediment slurry will raise contaminant removal effectiveness.

In each of the following examples, the flow from the nozzles discharging the cleaning fluid essentially form a plane. Each of the nozzles is attached to the frame member of the apparatus with the discharge portion of the nozzle pointed toward the center point of the apparatus.

The plane that is defined by the discharge of the nozzle devices, each of which are substantially the same height in the device, is defined in the following examples as alpha. If alpha equals zero, the plane defined by the discharge from the nozzle devices and the direction of the inlet stream of sediment slurry are parallel, i.e., flowing in the same direction. In this instance there is no collision between the sediment inflow and the discharge from the nozzle devices. If the angle between the discharge from the nozzle devices and the sediment inflow is 90 degrees, the nozzle discharge direction and the sediment in them are approximately perpendicular. As the angle of discharge increases, the inlet stream and the nozzle streams then oppose each other directly.

There is a further adjustment that can be made in the angle between the discharge from the nozzle flow devices and the sediment inflow devices. It is most preferred to have the angle at which the flow from the nozzle devices, which substantially discharge into a single plane, be approximately 30 degrees to the inflow from the sediment discharge.

In each of the following examples the number of nozzles was varied between one discharging nozzle and four discharging nozzle devices. It was concluded, based upon the evaluation of these results, that discharges from the nozzle devices were optimized at four nozzle devices. Minimal removal or effectiveness was achieved from discharge from one nozzle device.

In each of the following examples, it was shown that the angle of the plane defining the nozzle discharge relative to the direction of discharge of the slurry inlet flow was important in defining the efficiency of the invention. As the angle between the plane defining the nozzle discharge and the sediment inflow increase to 30 degrees, optimum results were defined.

The preceding information is used in each and every of the following examples.

EXAMPLE 2

In this example, grains were selected for above 50 mesh and below 50 mesh. In this example, temperature of the cleaning fluid was maintained at 100 degrees F. The number of nozzle devices employed was four. The angle of intersection between the plane defined by nozzle discharges and the inlet stream was maintained at 135 degrees.

Pressures were tested at 6,000 psi discharge from each nozzle, and at 8,000 psi and 12,000 psi per nozzle. It was determined that when grain size is less than 50 mesh, discharge from the nozzle devices in the range between 8,000 and 12,000 psi yielded a 99% removal effectiveness on particles passing 200 mesh. See Table 1.

TABLE 1

SEDIMENT WASHING EFFECTIVENESS
Variation of Grain Size and Nozzle Pressure

| Mesh Size | Pressure (psi) | | | | | |
|---|---|---|---|---|---|---|
| | 2,000 | 4,000 | 6,000 | 8,000 | 10,000 | 12,000 |
| 10 Mesh | 89 | 96 | 99 | 99 | 99 | 99% Removal |
| 50 Mesh | 90 | 96 | 99 | 99 | 99 | 99% Removal |
| 100 Mesh | 76 | 91 | 98 | 99 | 99.99 | |
| 200 Mesh | 72 | 90 | 97 | 99 | 99.99 | |

EXAMPLE 3

In this example, the number of nozzles employed was four, with each nozzle discharging cleaning fluid at 6,000 psi. The angle of discharge between the plane defined by the discharge of the nozzle devices and the inlet flow was maintained at 90 degrees.

In this example, temperatures of cleaning fluid was tested in a range, above and below 100 degrees F. These temperatures were less effective on both large and small grain sizes (see Table 2).

TABLE 2

SEDIMENT WASHING EFFECTIVENESS
Variation of Grain Size and Wash Temperature

| Mesh Size | Temperature | | | | |
|---|---|---|---|---|---|
| | 50 F. | 75 F. | 100 F. | 130 F. | 160 F. |
| 10 Mesh | 94 | 97 | 99 | 99 | 99% Removal |
| 50 Mesh | 92 | 95 | 99 | 99 | 99% Removal |
| 100 Mesh | 83 | 93 | 98 | 99 | 99 |
| 200 Mesh | 79 | 91 | 98 | 99 | 99 |

It was determined that temperatures must be maintained between 100 and 160 degrees fahrenheit to obtain 99% effectiveness on particles that passed 200 mesh when removal of a contaminant such as the oil used in this example. Other applications of the device may use a higher or lower optimal temperature of the cleaning liquid depending upon the type of contaminant and the average size of the particle treated in the slurry.

EXAMPLE 4

In this example the angle of intersection between the plane defined by the discharge from the nozzle and the inlet flow was adjusted to 45 degrees relative to the flow of the slurry. In this example the discharge from each of the nozzles was maintained at a constant 6,000 psi. The temperature of the washing fluid was maintained at 100 degrees F.

In this example, increasing the number of nozzles yielded a roughly linear increase in effectiveness without regard to particle size. However, the angle between the discharge of the nozzle devices and the inlet flow at alpha equals 45 degrees only yielded removal rates around 90% regardless of grain size tested. Therefore it was determined that the angle of discharge at 45 degrees may be that the approximate lower limit of effectiveness for materials that are of 200 mesh. See Table 3.

TABLE 3

SEDIMENT WASHING EFFECTIVENESS
Variation of Grain Size & # Nozzles for Alpha = 45

| Mesh Size | # Nozzles | | | |
|---|---|---|---|---|
| | 1 | 2 | 3 | 4 |
| 10 Mesh | 69 | 80 | 91 | 98% Removal |
| 50 Mesh | 70 | 80 | 89 | 96% Removal |
| 100 Mesh | 71 | 82 | 88 | 94 |
| 200 Mesh | 76 | 81 | 85 | 87 |

EXAMPLE 5

In this example, the discharge from the nozzle devices was maintained at 6,000 psi. The temperature of the washing liquid was maintained at 100 degrees F.

In this example, the angle of intersection of the discharge from the nozzle devices and the inlet flow was increased from 45 to 90 degrees. This dramatically increased the effectiveness of contaminant removal for the smallest grain sizes. In this example, the use of either three or four nozzles achieved removal of about 95% to about 97% for all grain sizes. See Table 4

TABLE 4

SEDIMENT WASHING EFFECTIVENESS
Variation of Grain Size & # Nozzles for Alpha = 90

| Mesh Size | # Nozzles | | | |
|---|---|---|---|---|
| | 1 | 2 | 3 | 4 |
| 10 Mesh | 68 | 80 | 96 | 99% Removal |
| 50 Mesh | 76 | 85 | 96 | 99% Removal |
| 100 Mesh | 78 | 86 | 95 | 97 |
| 200 Mesh | 83 | 89 | 94 | 96 |

EXAMPLE 6

In this example, the discharge from the nozzle devices was again maintained at 6,000 psi. The temperature of the washing liquid was maintained at 100 degrees fahrenheit. In this example, increasing the angle between the point of discharge of the nozzle devices and the inlet flow from 90 to 135 degrees yields a less spectacular improvement in the removal of contaminants than the results obtained in Example 5. See Table 5.

TABLE 5

SEDIMENT WASHING EFFECTIVENESS
Variation of Grain Size & # Nozzles for Alpha = 135

| Mesh Size | # Nozzles | | | |
|---|---|---|---|---|
| | 1 | 2 | 3 | 4 |
| 10 Mesh | 70 | 82 | 97 | 99% Removal |
| 50 Mesh | 77 | 86 | 96 | 99% Removal |
| 100 Mesh | 82 | 89 | 96 | 98 |
| 200 Mesh | 87 | 91 | 95 | 97 |

EXAMPLE 7

In this example the angle between the discharge from the nozzle devices and the angle determined between the direction of sediment inflow and the access determining the direction of the flow from the nozzle devices was varied. In this example, pressure of discharge from the nozzle devices was maintained at 6,000 psi. As is seen on Table 8 the increase of the angle between the nozzle flow and the sediment inflow about 30 degrees has very little effect.

As the angle between the plane defining the nozzle discharge and the sediment inflow increased to 30 degrees, optimum results were obtained as reflected in the Table 6. degrees, optimum results were obtained as reflected in Table 6.

TABLE 6

SEDIMENT WASHING EFFECTIVENESS
Variation of Grain Size & # Nozzles for Beta = 30

| Mesh Size | # Nozzles | | | |
|---|---|---|---|---|
| | 1 | 2 | 3 | 4 |
| 10 Mesh | 68 | 80 | 96 | 99% Removal |
| 50 Mesh | 76 | 85 | 96 | 99% Removal |
| 100 Mesh | 78 | 86 | 95 | 97 |
| 200 Mesh | 83 | 89 | 94 | 96 |

TABLE 7

SEDIMENT WASHING EFFECTIVENESS
Variation of Grain Size & # Nozzles for Beta = 0

| Mesh Size | # Nozzles | | | |
|---|---|---|---|---|
| | 1 | 2 | 3 | 4 |
| 10 Mesh | 69 | 78 | 82 | 81% Removal |
| 50 Mesh | 77 | 79 | 81 | 82% Removal |
| 100 Mesh | 77 | 80 | 82 | 83 |
| 200 Mesh | 84 | 85 | 84 | 86 |

TABLE 8

SEDIMENT WASHING EFFECTIVENESS
Variation of Grain Size & # Nozzles for Beta = 60

| Mesh Size | # Nozzles | | | |
|---|---|---|---|---|
| | 1 | 2 | 3 | 4 |
| 10 Mesh | 71 | 81 | 96 | 99% Removal |
| 50 Mesh | 78 | 85 | 95 | 99% Removal |
| 100 Mesh | 78 | 86 | 95 | 99 |
| 200 Mesh | 84 | 89 | 93 | 95 |

Other variations and adjustments of the device and method disclosed herein may be accomplished without departing from the invention disclosed herein.

What is claimed is:

1. A device for purifying contaminated particles wherein the particles are of a size less than about 5 millimeters in diameter, which particles are entrained in a liquid carrier to form a slurry, and wherein the device is within a substantially enclosed vessel, the vessel being fitted with means for affixing a frame having a nozzle carrying support means affixed within said vessel, comprising:

a) at least one high pressure nozzle cooperatively affixed to the frame, wherein said at least one nozzle has the capacity to discharge liquid at about 2000 psi to about 20,000 psi into an area of discharge;

b) a slurry inlet, wherein the slurry inlet is positioned to discharge a slurry inlet stream into the area of discharge from said at least one nozzle;

c) adjustment means cooperatively affixed to said frame and said at least one nozzle, wherein said adjustment means allow for the discharge of said at least one nozzle to be directed to an intersection point with the slurry inlet stream;

d) means for adjusting the stream of discharge from said at least one nozzle into a substantially planar configuration;

e) means for injecting said slurry into said area of discharge whereby the discharge from said at least one nozzle acts to remove contaminants from said contaminated particles; and f) means for adjusting the discharge from said at least one nozzle so that the angle of intersection of said nozzle discharge and the slurry inlet stream is between 0 degrees and 180 degrees.

2. The device of claim 1, wherein there are at least two nozzles arranged on the frame.

3. The device of claim 2, wherein each of said at least two nozzles-discharges liquid at about 5,000 psi to about 15,000 psi.

4. The device of claim 2, wherein the distance between the discharge points of said at least two nozzles is about 12 cm to about 52 cm.

5. The device of claim 1, wherein three nozzles are arranged on the frame approximately equidistant from each other.

6. The device of claim 1, wherein four nozzles are arranged on the frame approximately equidistant from each other.

7. The device of claim 1, wherein 5 nozzles are arranged on the frame approximately equidistant from each other.

8. The device of claim 1, wherein 6 nozzles are arranged on the frame approximately equidistant from each other.

9. The device of claim 1, wherein said at least one nozzle discharges liquid at about 10,000 psi to about 20,000 psi.

10. The device of claim 1, wherein said at least one nozzle device discharges liquid at about 10 degrees to about 180 degrees relative to the slurry inlet stream.

11. The device of claim 1, wherein the angle of intersection between said nozzle discharge and the slurry inlet stream is between 30 and 90 degrees.

12. The device of claim 1, wherein the angle of intersection between said nozzle discharge and the slurry inlet stream is between about 10 and about 100 degrees.

13. The device of claim 1, wherein the angle of intersection between said nozzle discharge and the slurry inlet stream is about 90 degrees.

14. The device of claim 1, wherein the angle of intersection between said nozzle discharge and the slurry inlet stream is about 30 degrees.

15. The device of claim 1, wherein said at least one nozzle discharges liquid at about 5,000 psi to about 15,000 psi.

16. The device of claim 1, wherein the liquid discharged from said at least one nozzle is at a temperature between about 35 and about 200 degrees F.

17. The device of claim 1, wherein the liquid discharged from said at least one nozzle is at a temperature of about 100 degrees F.

18. A method for purifying contaminated soil comprising the steps of:

a) selecting contaminated soil, wherein the soil particle size is less than about 5 mm diameter;

b) providing means for combining said contaminated soil particles with a liquid carrier to form a slurry;

c) further providing means for impinging at least two streams one stream of washing liquid, each stream from a nozzle discharge means, which discharge means are directed substantially opposite one another so as to create a zone of turbulence in the vicinity of intersection of said streams;

d) providing means for injecting said slurry into said zone of intersection of said washing liquid discharge streams; and e) providing means for collecting said slurry after said slurry has passed through the zone of intersection of said washing liquid streams, and separating slurry into fractions of liquids and particles after said particles exit said zone of intersection of said washing liquid streams.

19. The method of claim 18, wherein the liquid discharged by said at least two nozzles is water.

20. The method of claim 18, wherein the liquid discharged by said at least two nozzles is a mixture of water and surfactant, and the surfactant content of the liquid is about 0.1 percent and about 5 percent.

21. The method of claim 18, wherein the slurry contains about 5% to about 50% solids by weight.

22. The method of claim 18, wherein the slurry contains about 35% solids by weight.

23. The method of claim 18, wherein the temperature of said slurry is about 33° F. to about 200° F.

24. The method of claim 18, wherein the temperature of said slurry is about 100° to about 160° F.

25. The method of claim 18, wherein the number of nozzles is 4.

26. The method of claim 18, wherein the slurry is mixed with surfactant and contains about 49% water, about 50% soil and about 1% surfactant.

27. An apparatus for separating contaminants from contaminated fine soil, clays and silt and clay, wherein the apparatus is contained within a substantially closed vessel, said vessel fitted with apparatus comprising:

a) a frame fitted with at least one high pressure nozzle, said frame being cooperatively fitted within said vessel, and a discharge from said nozzle being directed at a right angle to the direction of flow of a slurry to be treated;

b) said frame having adjustment means affixed thereto for adjusting the angle of discharge of said at least one nozzle;

c) said at least one nozzle further being connected to a source of liquid, said liquid being delivered to said at least one nozzle under pressure;

d) means for delivering said slurry, said slurry containing particulate material having size less than about 5 mm diameter in a carrying fluid, to an intersection point with the discharge of said at least one nozzle; and e) means for collecting the said particulate material and said liquid after the particulate material has passed through the discharge of said at least one nozzle.

28. The apparatus of claim 27, wherein at least two nozzles are present.

29. The apparatus of claim 28, wherein the discharge from each said at least two nozzles is about 2,000 psi to about 20,000 psi.

* * * * *